(12) United States Patent
Watanabe et al.

(10) Patent No.: US 6,889,274 B2
(45) Date of Patent: May 3, 2005

(54) SIGNAL PROCESSING CIRCUIT

(75) Inventors: Hiromi Watanabe, Mitaka (JP); Takashi Nakamoto, Tama (JP); Hiroshi Hatae, Toda (JP); Junko Haruta, Kodaira (JP); Masaru Hase, Kokubunji (JP); Kenichi Iwata, Higashimurayama (JP); Hiroshi Yamada, Higashimurayama (JP); Yutaka Okada, Tokyo (JP)

(73) Assignee: Renesas Technology Corporation., Tokyo (JP)

( * ) Notice: Subject to any disclaimer, the term of this patent is extended or adjusted under 35 U.S.C. 154(b) by 573 days.

(21) Appl. No.: 09/870,630

(22) Filed: Jun. 1, 2001

(65) Prior Publication Data

US 2004/0225815 A1 Nov. 11, 2004

Related U.S. Application Data

(63) Continuation of application No. PCT/JP98/05449, filed on Dec. 3, 1998.

(51) Int. Cl.$^7$ .............................................. G06F 13/00
(52) U.S. Cl. ...................................................... 710/100
(58) Field of Search .............................. 710/20, 38, 48, 710/52, 100, 305, 312

(56) References Cited

U.S. PATENT DOCUMENTS

| | | | | |
|---|---|---|---|---|
| 4,271,518 A | * | 6/1981 | Birzele et al. | ............... 714/781 |
| 6,263,022 B1 | * | 7/2001 | Chen et al. | ............. 375/240.03 |
| 6,285,746 B1 | * | 9/2001 | Duran et al. | ............. 379/93.21 |
| 6,526,462 B1 | * | 2/2003 | Elabd | ......................... 710/242 |

FOREIGN PATENT DOCUMENTS

| | | |
|---|---|---|
| JP | 60-191374 | 9/1985 |
| JP | 62-192866 | 8/1987 |
| JP | 01-116682 | 10/1987 |
| JP | 06-205223 | 5/1992 |
| JP | 7-175759 | 7/1995 |
| JP | 10-048048 | 7/1996 |
| JP | 11032332 A | * 2/1999 ............ H04N/7/24 |

OTHER PUBLICATIONS

Yong Yao, "Chromatic's Mpact 2 Boosts 3D", Microprocesor Report, vol. 10, No. 18, Nov. 18, 1996, 6 pages.
Peter N. Glaskowsky, "Fujitsu Aims Media Processor at DVD", Microprocesor Report, vol. 10, No. 15, Nov. 18, 1996, pp. 11–13.
Brian Case, "First Trimedia Chip Boards PCI Bus", Microprocesor Report, Nov. 13, 1995, pp. 22–25.
Yong Yao, "Samsung Launches Media Processor", Microprocesor Report, vol. 10, No. 11, Aug. 26, 1996, 5 pages.
Linley Gwennap, "Mitsubishi Designs DVD Decoder", Microprocesor Report, vol. 10, No. 16, Dec. 9, 1996, 5 pages.
PCT/JP98/05449, International Preliminary Examination Report dated Feb. 12, 2001.

\* cited by examiner

*Primary Examiner*—Paul R. Myers
(74) *Attorney, Agent, or Firm*—Reed Smith LLP; Stanley P. Fisher, Esq.; Juan Carlos A. Marquez, Esq.

(57) ABSTRACT

A signal processing circuit having a data input-output (I/O) circuit, a microprocessor, a dedicated processing circuit, a local memory, and a memory access control circuit interconnected over a bus. The system bus connects to the data I/O circuit, microprocessor, dedicated processing circuit, and memory access control circuit. A local memory bus connects to the local memory. First, second, and third connection circuits connect between the system bus and local memory bus, between a first local bus in the dedicated processing circuit and the local memory bus, and between a second local bus in the data I/O circuit and the local memory bus. The memory access control circuit controls the first, second, and third connection circuits according to priorities assigned for the connection circuits and determines which of the second local bus, first local bus, and system bus will be connected to the local memory bus.

28 Claims, 7 Drawing Sheets

(a)

(b)

SIGNAL PROCESSING CIRCUIT

This application is a continuation of PCT Application No. PCT/JP98/05449 filed on Dec. 3, 1998, which designates the United States, and claims priority therefrom under 35 U.S.C. § 120.

TECHNICAL FIELD

The present invention relates to a signal processing circuit, or more particularly, a signal processing circuit for processing at a high speed a large amount of data such as picture data using a microprocessor.

BACKGROUND ART

In general, assuming that picture data is stored in a memory and encoded, decoded, or anyhow, processed using a microprocessor, a data transfer rate demanded for data transfer between the microprocessor and memory exceeds 100 Mbps. When the picture data is transferred from the microprocessor to the memory over a system bus, the system bus is occupied with the data transfer. This poses a problem in that the processor cannot fulfill its essential signal processing feature. In efforts to solve this problem, an image processing unit has been proposed (Japanese Unexamined Patent Publication Nos. 62-192866, 60-191374, and 7-175759). The image processing unit includes a local memory in which video data or the like is stored, and a local memory bus over which video data is transferred to the local memory independently of the system bus. A microprocessor (CPU) manages bus use authorities given to devices for use of the local memory bus.

The local memory in which video data or the like is stored is accessed directly by an input-output circuit that receives or transmits video, whereby a signal processing time required by the processor can be reduced. Moreover, assuming that image data processing consists of arithmetic operations and signal processing jobs other than the arithmetic operations, the arithmetic operations should be processed using an arithmetic unit incorporated in the processor, while the other signal processing jobs should be performed as a parallel operation at a high speed. If the signal processing jobs are executed using a dedicated arithmetic circuit, they can be achieved at a higher processing speed. From this viewpoint, the local memory should preferably be designed so that it can be accessed by a circuit that receives or transmits a video signal, a video processing circuit that uses a dedicated arithmetic unit to process a video signal, and a processor alike.

DISCLOSURE OF THE INVENTION

However, but for a router and a routing control circuit, the video input-output circuit, video processing circuit, and processor cannot be functioned effectively. The router enables the video input-output circuit, video processing circuit, and processor to access the local memory. In conventionally proposed image processing units, processors control routing. The processor must therefore bear a large burden. This is the problem that the present inventor has revealed to underlie the aforesaid background art.

An object of the present invention is to provide a signal processing unit that has a processor, a data input-output circuit, a dedicated processing circuit, and a memory interconnected over a bus. Herein, the performances of the processor, data input-output circuit, and dedicated processing circuit can be drawn out to the greatest possible extent.

Another object of the present invention is to provide a signal processing circuit that includes a system bus which is connected to a microprocessor, and a local memory bus over which data is transferred to a local memory independently of the system bus. In the signal processing circuit, even when a data input-output circuit and a dedicated processing circuit are in operation, the microprocessor can directly access the local memory.

In efforts to accomplish the above objects, according to the present invention, there is provided a signal processing circuit that includes a data input-output circuit, a microprocessor, a dedicated processing circuit, a local memory, and a memory access control circuit interconnected over a bus.

The bus includes a system bus and a local memory bus. The system bus is connected to the data input-output circuit, microprocessor, dedicated processing circuit, and memory access control circuit respectively. The local memory bus is connected to the local memory. First, second, and third connection circuits are connected between the system bus and local memory bus, between a first local bus included in the dedicated processing circuit and the local memory bus, and between a second local bus included in the data input-output circuit and the local memory bus. The memory access control circuit controls the first, second, and third connection circuits according to the priorities assigned for the connections of the connection circuits.

The system bus and local memory bus each contain a data bus, an address bus, and a control line. The system bus is used to transfer control information among the data input-output circuit, dedicated processing circuit, and memory access control circuit, and to transfer data processed by the circuits or data to be processed thereby. The microprocessor accesses the local memory via the first connection circuit.

Over the local memory bus, data is transferred to or from the dedicated processing circuit via the second connection circuit, and to or from the data input-output circuit via the third connection circuit.

According to the present invention, if the data input-output circuit, dedicated processing circuit, and microprocessor request data transfer to or from the local memory over the second local bus, first local bus, and system bus respectively, the data input-output circuit, dedicated processing circuit, and microprocessor each issue a local memory bus use request to the memory access control circuit. The memory access control circuit controls the first connection circuit, second connection circuit, and third connection circuit according to the priorities predetermined for the connections of the connection circuits. The memory access control circuit then determines one of the second local bus, first local bus, and system bus as a bus to be connected to the local memory bus. At the same time, the other buses are disconnected from the local memory bus. Thus, the data input-output circuit, dedicated processing circuit, and microprocessor will not be hindered from acting independently of one another. This leads to a high ratio of a parallel processing form, in which the signal processing circuit may operate, to a series processing form in which it may. The data input-output circuit, dedicated processing circuit, and microprocessor can therefore fulfill their performances. Moreover, the microprocessor can directly access the local memory via the first connection circuit. This results in improved accessibility.

The present invention will prove effective in processing a large amount of data in real time, for example, in encoding or decoding highly efficiently compressed image data.

Hereinafter, a description will be made of embodiments of a signal processing circuit for image data in accordance with the present invention. Needless to say, the embodiments can be implemented in cases where a large amount of data other than video data is processed at a high speed in real time.

BEST MODE FOR CARRYING OUT THE INVENTION

Figure 1:
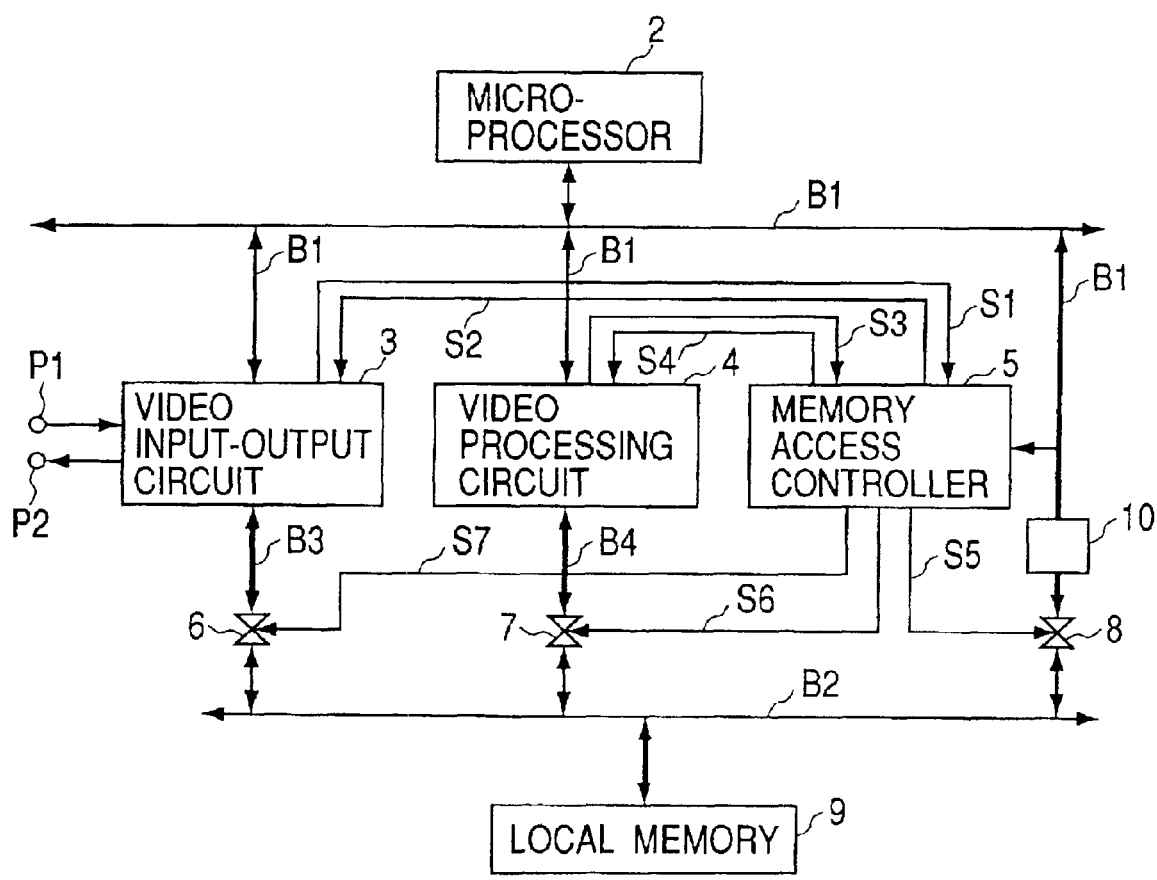
FIG. 1 shows a first embodiment of a signal processing circuit in accordance with the present invention.

FIG. 1 shows a first embodiment of a signal processing circuit in accordance with the present invention. The present embodiment is adapted to a video processing integrated circuit that processes image data.

The signal processing circuit has a video input-output circuit 3, a microprocessor 2, a video processing circuit 4, and a memory access control circuit 5 interconnected over a system bus B1, and includes a local memory 9 connected to a local bus B2. The video input-output circuit 3 is a data input-output circuit, and the video processing circuit 4 is a dedicated processing circuit. First, second, and third bus connectors 8, 7, and 6 are connected between the system bus B1 and local memory bus B2, between a local bus B4 and the local memory bus B2, and between a second local bus B3 and the local memory bus B2. The local bus B4 is included in the video processing circuit 4, and the second local bus B3 is included in the video input-output circuit 3. The memory access control circuit 5 controls the first, second, and third bus connectors 8, 7, and 6 according to the priorities assigned for the connections of the connectors.

The system bus B1 and local memory bus B2 are directly linked with the first bus connector 8 and a bus bridge 10 between them. The bus bridge 10 is a means for converting the number of bits to be transmitted over one bus into the number of bits to be transmitted over the other bus.

The system bus B1 and local memory bus B2 are depicted as if they were single-wire lines. Actually, the system bus B1 and local memory bus B2 each contain a data bus, an address bus, and a control line. Over the system bus B1 and local memory bus B2, control information is transferred among the circuits, microprocessor, and local memory, or processing data is transferred in a bit parallel form.

The video input-output circuit 3 is connected to the local memory bus B2 via the bus connector 6 connected to the local bus B3, whereby data is transferred between the local memory 9 and an input line P1 or output line P2.

The video processing circuit 4 is connected to the local memory bus B2 via the bus connector 7 connected to the local bus B4, whereby data is transferred between the video processing circuit 4 and local memory 9. The local memory 9 is used to store input video data or record display video data.

Figure 2:
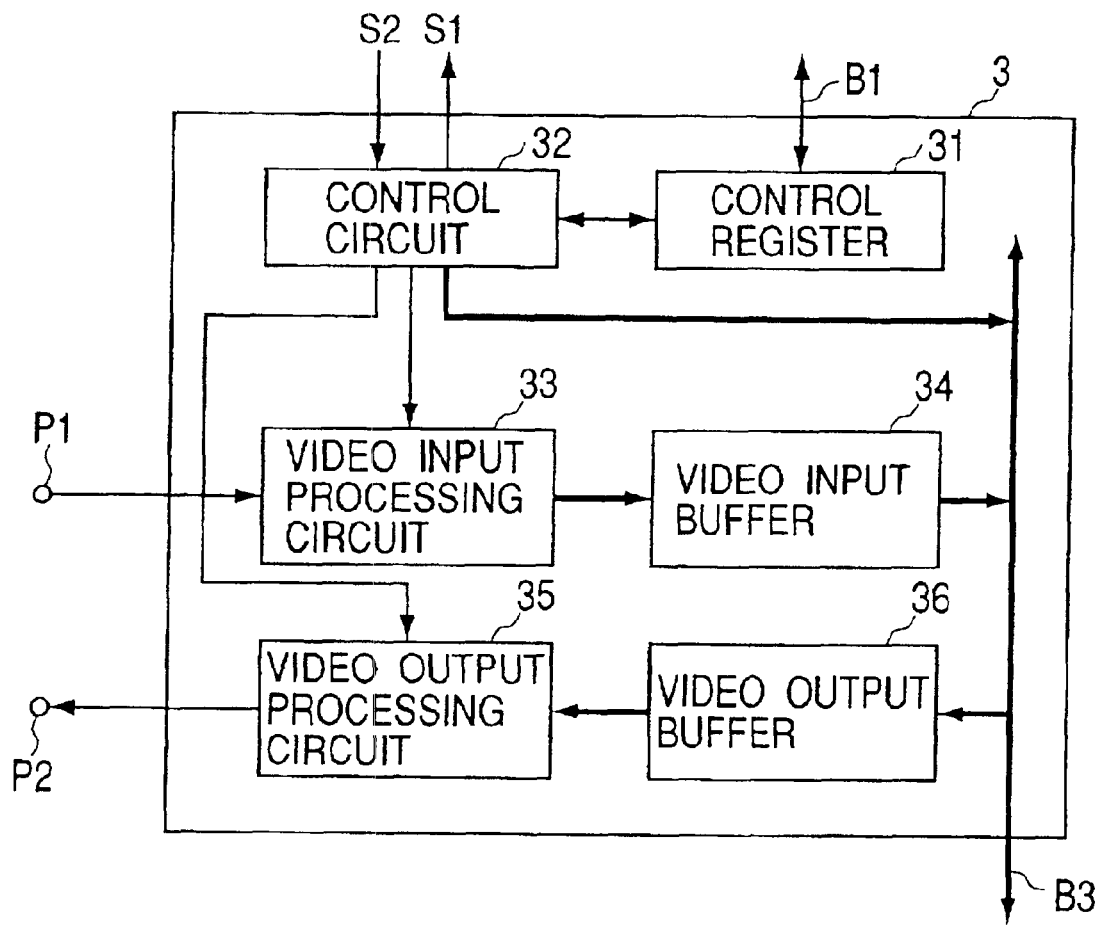
FIG. 2 shows the configuration of a video input-output circuit 3 shown in FIG. 1.

FIG. 2 shows the configuration of the video input-output circuit 3 shown in FIG. 1. A control register 31 included in the video input-output circuit 3 is connected to the microprocessor 2 over the system bus B1. A plurality of items of control information based on which the video input-output circuit 3 acts is set in the control register 31. For example, addresses in the local memory 9 at which display video is recorded are set in the control register 31. A control circuit 32 reads the control information stored in the control register 31. Based on the control information, the control circuit 32 controls a video input processing circuit 33, a video input buffer 34, a video output processing circuit 35, and a video output buffer 36, and controls inputting or outputting of input or output video data. The control circuit 32 requests over a signal line S1 the memory access control circuit 5 to give a bus authority for the local memory bus B2. Moreover, in response to an enabling signal sent from the memory access control circuit 5 over a signal line S2, the control circuit 32 controls the local memory 9 to be accessed over the second local bus B3.

Moreover, when the video input-output circuit transfers data to or from the local memory 9, the video input-output circuit issues a memory access request to the memory access controller 5 over the signal line S1. The memory access controller 5 judges the priority of the bus connector 6. If the local memory 9 is available, the memory access controller 5 transmits an access enabling signal to the video input-output circuit over the signal line S2. Furthermore, the bus connector 6 is closed in order to connect the video input-output circuit 3 to the local memory bus B2 by way of the local bus B3. At the same time, the connectors 7 and 8 are opened in order to unlink the local bus B4 and system bus B1 from the local memory bus B2.

Figure 3:
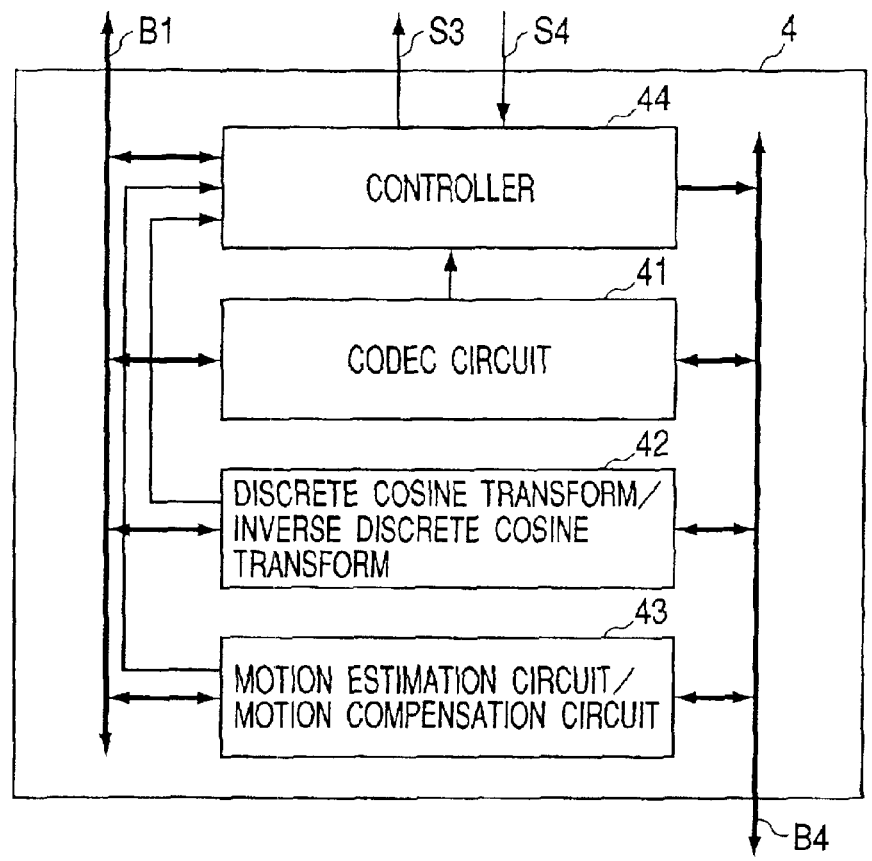
FIGS. 3a and 3b show the configuration of a video processing circuit 4 shown in FIG. 1.
Figure 3:
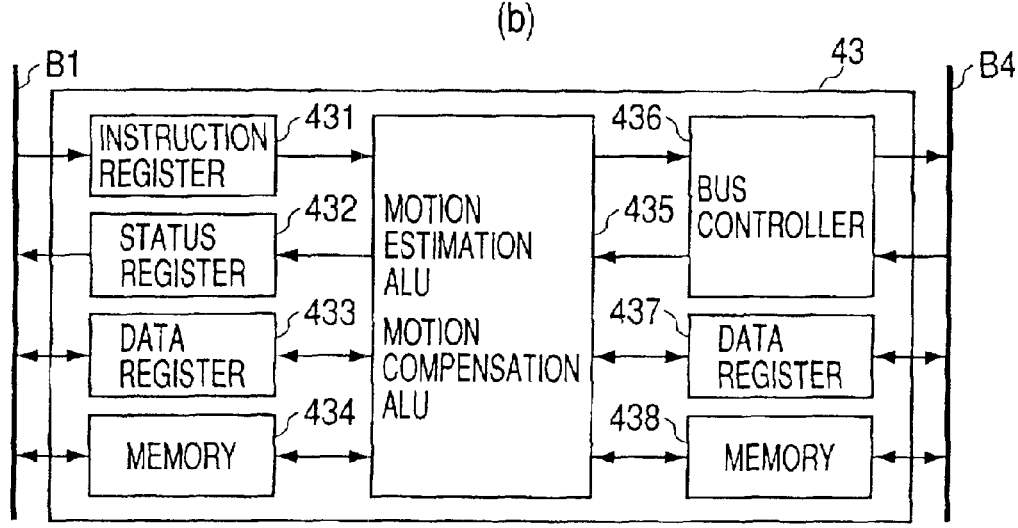

FIGS. 3a and 3b show the configuration of the video processing circuit 4 in FIG. 1.

The microprocessor 2 and video processing circuit 4 have their various video processing circuits connected to one another over the system bus B1. In an example shown in FIG. 3a, the video processing circuit is designed to encode data according to the MPEG or the like. A codec circuit 41, a discrete cosine transform circuit/inverse discrete cosine transform circuit 42, and a motion estimation circuit/motion compensation circuit 43 used to encode or decode image data according to the MPEG or the like are interconnected.

The circuits 41 to 43 act to perform different kinds of signal processing that are their features in response to a control instruction transferred over the system bus B1. The circuits 41 to 43 are interconnected over the first local bus B4 and transfer data to or from one another. Moreover, a controller 44 that controls the whole of the video processing circuit 4 requests over the signal line S3 the memory access control circuit 5 to give a bus authority for the local memory bus B2 when any of the circuits 41 to 43 needs data transfer to or from the local memory 9. Moreover, in response to an access enabling signal sent from the memory access control circuit 5 over the signal line S4, the controller 44 controls the local memory 9 to be accessed over the first local bus B4.

Moreover, when the video processing circuit 4 transfers data to or from the local memory 9, the video processing circuit 4 issues a memory access request to the memory access controller 5 over the signal line S3. The memory access controller 5 judges the priority of the bus connector 7. If the local memory 9 is available, the memory access controller 5 transfers an enabling signal over the signal line S4. Furthermore, the bus connector 7 is closed in order to link the local bus B4 and the local memory bus B2. The connectors 6 and 8 are opened in order to unlink the local bus B3 and system bus B1 from the local memory B2.

FIG. 3b shows in detail the configuration of the motion estimation circuit/motion compensation circuit 43 shown in FIG. 3a. The bus B1 is connected to an instruction register 431, a status register 432, data register 433, and memory 434. The bus B4 is connected to a data register 437, memory 438 and a bus controller 436.

Figure 4:
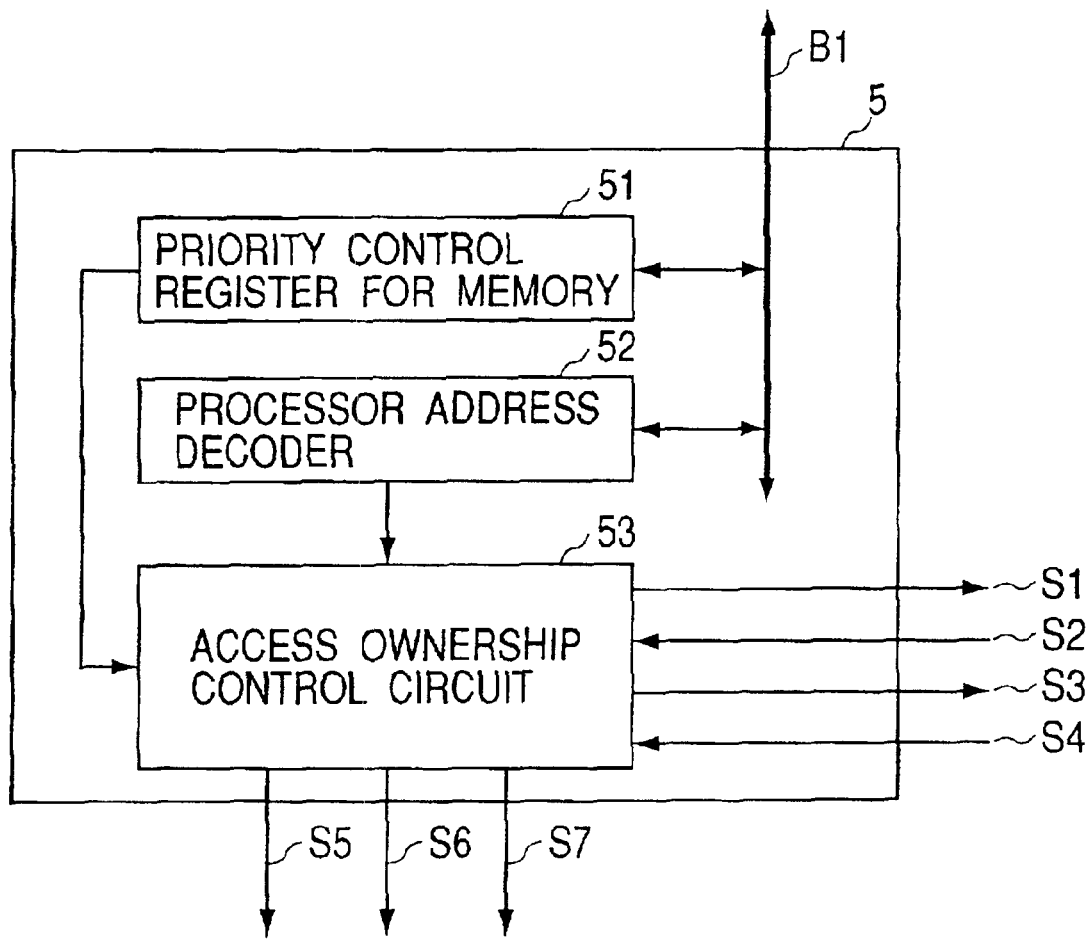
FIG. 4 shows the configuration of a memory access controller 5 shown in FIG. 1.

FIG. 4 shows the configuration of the memory access controller 5 shown in FIG. 1.

The memory access controller 5 includes a priority control register for memory 51. The microprocessor 2 instructs over the system bus B1 the priority control register for memory 51 to assign a priority, according to which one connector has priority over another in occupying the local memory bus B2, to each connector. Based on the priorities assigned to the connectors, the local bus B4, local bus B3, and system bus B1 connected to the connectors obtain a bus authority for the local memory bus B2. The microprocessor 2 instructs an access ownership control circuit 53 to control the connectors 6, 7, and 8 over the signal lines S5, S6, and S7 respectively. Thus, data is transferred to or from the local memory 9.

In the aforesaid embodiment, the video processing circuit is designed to process image data according to the MPEG or the like. The present invention does not specify any video processing circuit. The video processing circuit 4 may include other various processing circuits.

Figure 5:
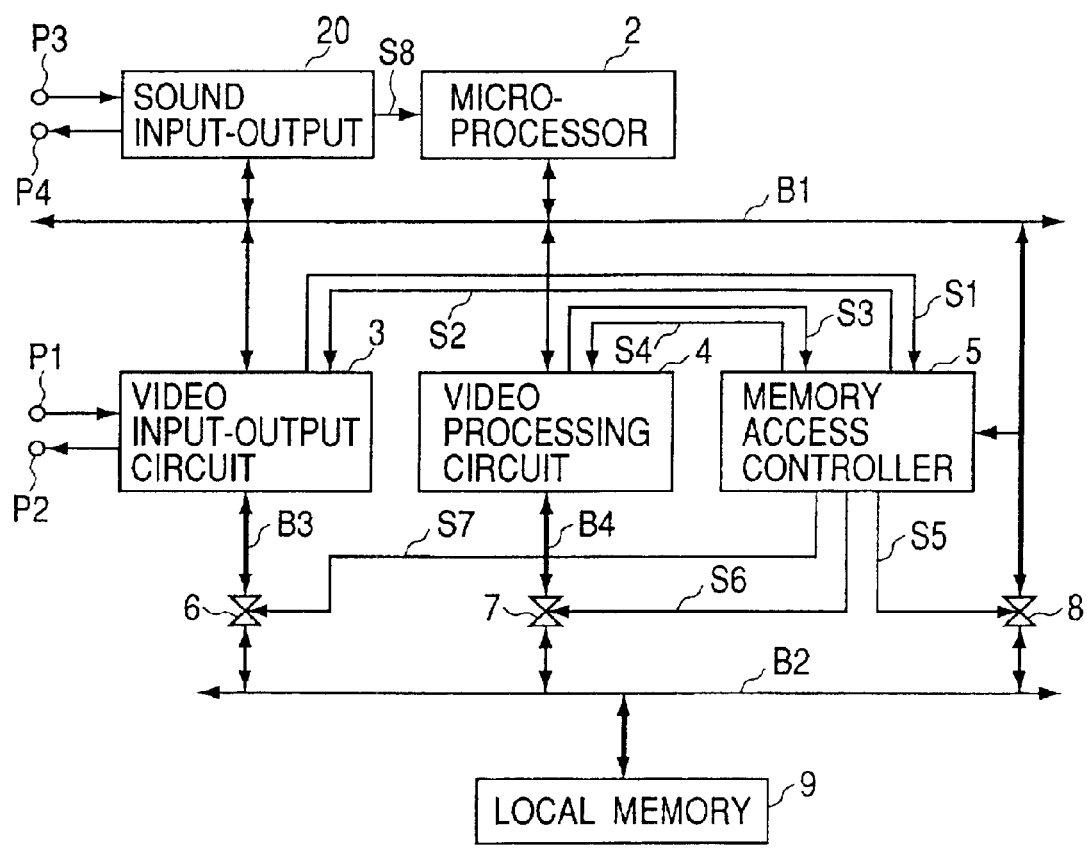
FIG. 5 shows a second embodiment of the signal processing circuit in accordance with the present invention.

FIG. 5 shows another embodiment of the signal processing circuit in accordance with the present invention. The present embodiment is adapted to a video processing integrated circuit that processes image data.

The present invention processes not only video but also an acoustic signal. Compared with a video signal, the acoustic signal requires a lower transfer rate and a smaller storage capacity, and can be processed by the microprocessor 2. Therefore, a sound input-output circuit 20 is connected directly to the system memory bus B1. When the sound input-output circuit 20 must transfer acoustic data, the sound input-output circuit 20 applies an interrupt signal to the processor 2 over a signal line S8. The microprocessor 2 senses the interrupt and controls data transfer to or from the sound input-output circuit 20. The processing sequence of video data, and the configurations and actions of the circuits are identical to those implemented in the embodiment shown in FIG. 1. The same reference numerals as those shown in FIG. 1 will be assigned to identical components, and the description of the components will be omitted.

Figure 6:
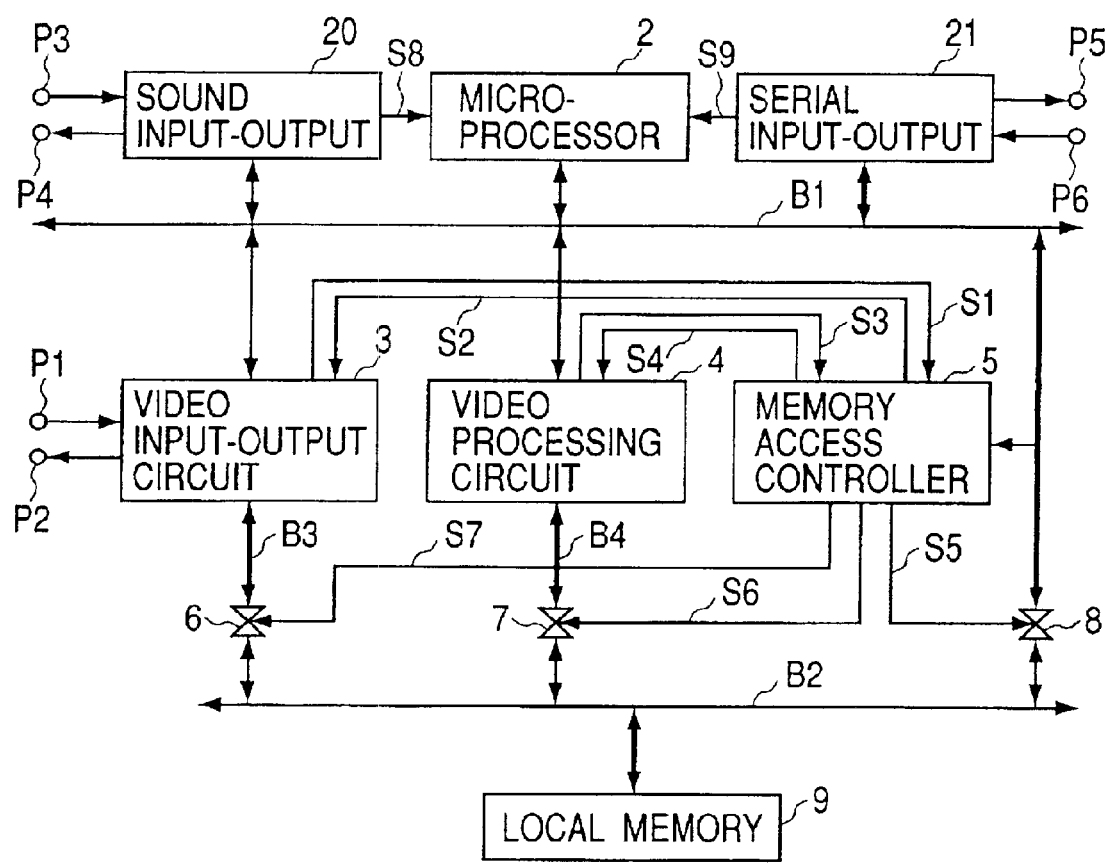
FIG. 6 shows a third embodiment of the signal processing circuit in accordance with the present invention.

FIG. 6 shows a third embodiment of the signal processing circuit in accordance with the present invention. The present embodiment is adapted to a video processing integrated circuit that processes image data. The present embodiment has not only the capability of the video processing circuit, which is employed in the second embodiment, but also the capability of a circuit for processing another type of signal. A serial data input-output circuit 21 having input-output terminals P5 and P6 is included additionally. Serial data includes a compressed video signal and a compressed sound signal. Compared with an ordinary video signal, the compressed signal requires a lower transfer rate and a smaller storage capacity because it is compressed. Moreover, the compressed signal can be processed by the microprocessor 2. Therefore, the serial data input-output circuit 21 is connected to the system memory bus B1. When the serial data input-output circuit 21 must transfer serial data, the serial data input-output circuit 21 applies an interrupt signal to the processor 2 over a signal line S9. The microprocessor 2 senses the interrupt, and controls data transfer to or from the serial data input-output circuit 21. The video data processing sequence, and the configurations and actions of the circuits are identical to those implemented in the embodiment shown in FIG. 1. The same reference numerals will be assigned to identical components, and the description of the components will be omitted.

Figure 7:
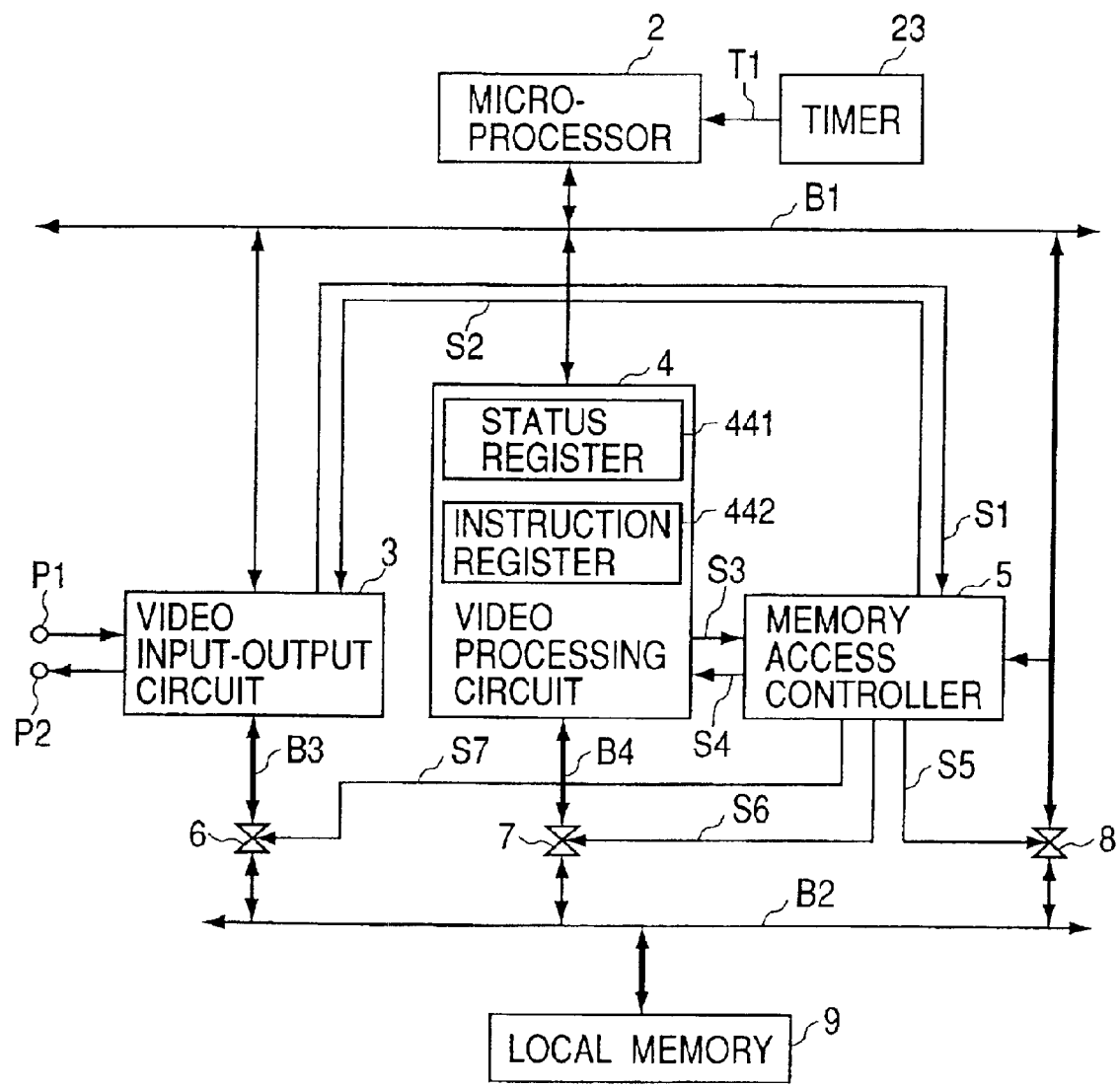
FIG. 7 shows a fourth embodiment of the signal processing circuit in accordance with the present invention.

FIG. 7 shows a fourth embodiment of the signal processing circuit in accordance with the present invention. The present embodiment is adapted to a video processing integrated circuit that processes image data. According to the present embodiment, the microprocessor 2 accesses a status register 441 and an instruction register 442, which are included in the video processing circuit 4, in response to a cyclic interrupt signal T1 produced by a timer 23. The status register 441 is a register that indicates the current state of the video processing circuit 4. The simplest information is information that processing is under way if there is any such processing, and indicated with a flag. The instruction register 442 is a register that indicates an instruction which the microprocessor 2 wants the video processing circuit 4 to execute. The video processing circuit 4 executes an instruction indicated in the instruction register 442. Specifically, the video processing circuit 4 cyclically reads the status register 441 in response to the interrupt signal T1 sent from the timer 23. The microprocessor 2 judges whether an instruction may be issued to the video processing circuit 4. If the video processing circuit 4 can receive the instruction, the microprocessor 2 issues an instruction to the instruction register 442.

Owing to the routing and the control sequence for controlling a local memory bus access authority that are features of the present invention, the performances of the microprocessor, video input-output circuit or sound input-output circuit, and video processing circuit can be utilized to the greatest possible extent. In particular, when it comes to image processing, a large amount of image data is written in or read from the local memory 9. By controlling the connection circuits 6, 7, and 8, data transfer between the local memory 9 and microprocessor 2 can be achieved in parallel with data transfer between the local memory 9 and video input-output circuit 3 or video processing circuit 4. Moreover, data can be directly transferred between the local bus B2 and system bus B1 without intervention of a register. This results in high-speed processing.

INDUSTRIAL APPLICABILITY

The embodiments have been described in relation to a signal processing circuit for video in which the present invention is implemented particularly effectively. The present invention is not limited to the aforesaid embodiments. Apparently, the present invention can be adapted to signal processing units that must process a large amount of data in real time. Moreover, the bus bridge 10 is included in the first embodiment alone, but may be adopted for the other embodiments.

What is claimed is:

1. A signal processing circuit having a data input-output circuit, a microprocessor, a dedicated processing circuit, a local memory, and a memory access control circuit interconnected over a bus, wherein:

said bus includes a system bus that is connected to said data input-output circuit, said microprocessor, said dedicated processing circuit, and said memory access control circuit, and a local memory bus that is connected to said local memory;

first, second, and third connection circuits are connected between said system bus and said local memory bus, between a first local bus included in said dedicated processing circuit and said local memory bus, and between a second local bus included in said data input-output circuit and said local memory bus; and said memory access control circuit controls the connections of said first, second, and third connection circuits.

2. A signal processing circuit according to claim 1, wherein said memory access control circuit controls the connections of said first, second, and third connection circuits according to the priorities predetermined for the connections.

3. A signal processing circuit according to claim 1, further comprising a second input-output circuit that is connected to said system bus, produces an interrupt request to be issued to said microprocessor, and transfers data over said system bus under control of said microprocessor.

4. A signal processing circuit according to claim 1, further comprising a second input-output circuit that receives or transmits a serial signal, produces an interrupt request to be issued to said microprocessor, and transfers the serial signal over said system bus under control of said microprocessor.

5. A signal processing circuit according to claim 1, further comprising a timer that cyclically applies an interrupt signal to said microprocessor, and a control means that includes a status register which indicates the processing state of said dedicated processing circuit, and an instruction register in which said microprocessor sets processing to be performed by said dedicated processing circuit, wherein:

said microprocessor reads a value from said status register in response to the cyclic interrupt signal, and judges whether the next processing instruction can be issued to said dedicated processing circuit; and when the next processing instruction can be issued, said control means allows the instruction to be written in said instruction register.

6. A signal processing circuit according to claim 1, wherein data to be processed by said dedicated processing circuit is stored in said local memory, and data stored in said local memory is read by way of said third connection circuit, said second local bus, and said data input-output circuit.

7. A signal processing circuit according to claim 1, wherein said data input-output circuit is a video input-output circuit that receives or transmits video data, said dedicated processing circuit is a video processing circuit including at least one of an encoding circuit, a decoding circuit, a discrete cosine transform circuit, an inverse discrete cosine transform circuit, a motion estimation circuit, and a motion compensation circuit.

8. A signal processing circuit according to claim 7, wherein said memory access control circuit includes a control means that stores image data received in real-time in said local memory by way of said data input-output circuit, said second local bus, and said third connection circuit, and that transfers the image data stored in said local memory to said video processing circuit by way of said second connection circuit and said first local bus.

9. A signal processing circuit according to claim 7, further comprising a second input-output circuit that receives or transmits a voice signal, is connected to said system bus, produces an interrupt request to be issued to said microprocessor, and transfers data over said system bus under control of said microprocessor.

10. A signal processing circuit according to claim 7, further comprising a second input-output circuit that receives or transmits a serial signal that is either an encoded video signal or an encoded voice signal, produces an interrupt request to be issued to said microprocessor, and transfers data of the serial signal over said system bus under control of said microprocessor.

11. A signal processing circuit according to claim 2, further comprising a second input-output circuit that is connected to said system bus, produces an interrupt request to be issued to said microprocessor, and transfers data over said system bus under control of said microprocessor.

12. A signal processing circuit according to claim 2, further comprising a second input-output circuit that receives or transmits a serial signal, produces an interrupt request to be issued to said microprocessor, and transfers the serial signal over said system bus under control of said microprocessor.

13. A signal processing circuit according to claim 3, further comprising a third input-output circuit that receives or transmits a serial signal, produces an interrupt request to be issued to said microprocessor, and transfers the serial signal over said system bus under control of said microprocessor.

14. A signal processing circuit according to claim 11, further comprising a third input-output circuit that receives or transmits a serial signal, produces an interrupt request to be issued to said microprocessor, and transfers the serial signal over said system bus under control of said microprocessor.

15. A signal processing circuit according to claim 2, further comprising a timer that cyclically applies an interrupt signal to said microprocessor, and a control means that includes a status register which indicates the processing state of said dedicated processing circuit, and an instruction register in which said microprocessor sets processing to be performed by said dedicated processing circuit, wherein:

said microprocessor reads a value from said status register in response to the cyclic interrupt signal, and judges whether the next processing instruction can be issued to said dedicated processing circuit; and when the next processing instruction can be issued, said control means allows the instruction to be written in said instruction register.

16. A signal processing circuit according to claim 3, further comprising a timer that cyclically applies an interrupt signal to said microprocessor, and a control means that includes a status register which indicates the processing state of said dedicated processing circuit, and an instruction register in which said microprocessor sets processing to be performed by said dedicated processing circuit, wherein:

said microprocessor reads a value from said status register in response to the cyclic interrupt signal, and judges whether the next processing instruction can be issued to said dedicated processing circuit; and when the next processing instruction can be issued, said control means allows the instruction to be written in said instruction register.

17. A signal processing circuit according to claim 11, further comprising a timer that cyclically applies an interrupt signal to said microprocessor, and a control means that includes a status register which indicates the processing state of said dedicated processing circuit, and an instruction register in which said microprocessor sets processing to be performed by said dedicated processing circuit, wherein:

said microprocessor reads a value from said status register in response to the cyclic interrupt signal, and judges whether the next processing instruction can be issued to said dedicated processing circuit; and when the next processing instruction can be issued, said control means allows the instruction to be written in said instruction register.

18. A signal processing circuit according to claim 2, wherein data to be processed by said dedicated processing circuit is stored in said local memory, and data stored in said local memory is read by way of said third connection circuit, said second local bus, and said data input-output circuit.

19. A signal processing circuit according to claim 3, wherein data to be processed by said dedicated processing circuit is stored in said local memory, and data stored in said local memory is read by way of said third connection circuit, said second local bus, and said data input-output circuit.

20. A signal processing circuit according to claim 11, wherein data to be processed by said dedicated processing circuit is stored in said local memory, and data stored in said local memory is read by way of said third connection circuit, said second local bus, and said data input-output circuit.

21. A signal processing circuit according to claim 2, wherein said data input-output circuit is a video input-output circuit that receives or transmits video data, said dedicated processing circuit is a video processing circuit including at least one of an encoding circuit, a decoding circuit, a discrete cosine transform circuit, an inverse discrete cosine transform circuit, a motion estimation circuit, and a motion compensation circuit.

22. A signal processing circuit according to claim 21, wherein said memory access control circuit includes a control means that stores image data received in real-time in said local memory by way of said data input-output circuit, said second local bus, and said third connection circuit, and that transfers the image data stored in said local memory to said video processing circuit by way of said second connection circuit and said first local bus.

23. A signal processing circuit according to claim 21, further comprising a second input-output circuit that receives or transmits a voice signal, is connected to said system bus, produces an interrupt request to be issued to said microprocessor, and transfers data over said system bus under control of said microprocessor.

24. A signal processing circuit according to claim 8, further comprising a second input-output circuit that receives or transmits a voice signal, is connected to said system bus, produces an interrupt request to be issued to said microprocessor, and transfers data over said system bus under control of said microprocessor.

25. A signal processing circuit according to claim 22, further comprising a second input-output circuit that receives or transmits a voice signal, is connected to said system bus, produces an interrupt request to be issued to said microprocessor, and transfers data over said system bus under control of said microprocessor.

26. A signal processing circuit according to claim 21, further comprising a second input-output circuit that receives or transmits a serial signal that is either an encoded video signal or an encoded voice signal, produces an interrupt request to be issued to said microprocessor, and transfers data of the serial signal over said system bus under control of said microprocessor.

27. A signal processing circuit according to claim 8, further comprising a second input-output circuit that receives or transmits a serial signal that is either an encoded video signal or an encoded voice signal, produces an interrupt request to be issued to said microprocessor, and transfers data of the serial signal over said system bus under control of said microprocessor.

28. A signal processing circuit according to claim 22, further comprising a second input-output circuit that receives or transmits a serial signal that is either an encoded video signal or an encoded voice signal, produces an interrupt request to be issued to said microprocessor, and transfers data of the serial signal over said system bus under control of said microprocessor.

* * * * *